US012139162B2

(12) United States Patent
Sato et al.

(10) Patent No.: US 12,139,162 B2
(45) Date of Patent: Nov. 12, 2024

(54) CONTROL DEVICE AND CONTROL METHOD

(71) Applicant: DENSO TEN Limited, Hyogo (JP)

(72) Inventors: Kosuke Sato, Hyogo (JP); Takeshi Matsumoto, Hyogo (JP); Minoru Yoshimura, Hyogo (JP); Yasuomi Kimura, Hyogo (JP)

(73) Assignee: DENSO TEN Limited, Hyogo (JP)

( * ) Notice: Subject to any disclaimer, the term of this patent is extended or adjusted under 35 U.S.C. 154(b) by 28 days.

(21) Appl. No.: 17/948,762

(22) Filed: Sep. 20, 2022

(65) Prior Publication Data

US 2023/0242136 A1 Aug. 3, 2023

(30) Foreign Application Priority Data

Jan. 31, 2022 (JP) .................................. 2022-013612

(51) Int. Cl.
*B60W 50/14* (2020.01)
*B60W 60/00* (2020.01)

(52) U.S. Cl.
CPC ........ *B60W 50/14* (2013.01); *B60W 60/0059* (2020.02); *B60W 2050/143* (2013.01); *B60W 2050/146* (2013.01)

(58) Field of Classification Search
CPC ............. B60W 50/14; B60W 60/0059; B60W 2050/143; B60W 2050/146; B60W 2050/0295; B60W 50/029; B60W 60/005
See application file for complete search history.

(56) References Cited

U.S. PATENT DOCUMENTS

| 4,222,031 | A | * | 9/1980 | Okamoto | G07C 5/0825 340/459 |
| 6,203,355 | B1 | * | 3/2001 | Neblett | B60L 50/66 439/372 |
| 6,225,153 | B1 | * | 5/2001 | Neblett | H01R 29/00 438/188 |
| 9,274,525 | B1 | * | 3/2016 | Ferguson | G01S 7/52004 |
| 10,145,881 | B1 | * | 12/2018 | Salter | B60L 58/14 |
| 11,097,842 | B1 | * | 8/2021 | Archer | G05D 1/0022 |
| 11,551,644 | B1 | * | 1/2023 | Sanchez | G09G 3/03 |
| 11,613,184 | B1 | * | 3/2023 | Wiegman | B60L 53/16 320/108 |
| 2007/0139016 | A1 | * | 6/2007 | Lambert | H02J 7/0036 320/140 |
| 2008/0319597 | A1 | * | 12/2008 | Yamada | B60K 6/46 701/22 |
| 2010/0275564 | A1 | * | 11/2010 | Baetica | A01D 34/37 429/96 |

(Continued)

FOREIGN PATENT DOCUMENTS

JP 2021-009432 A 1/2021

*Primary Examiner* — Curtis J King
(74) *Attorney, Agent, or Firm* — Paratus Law Group, PLLC (57) ABSTRACT

A control device includes a controller configured to perform a notification whether automatic driving of a vehicle is able to be started, in a different mode according to at least either of a first state where the automatic driving is able to be permitted, a second state where the automatic driving is unable to be permitted due to an equipment abnormality, or a third state where the automatic driving is unable to be permitted for a temporary reason without an equipment abnormality.

15 Claims, 7 Drawing Sheets

(56) References Cited

U.S. PATENT DOCUMENTS

| | | | |
|---|---|---|---|
| 2011/0178663 A1* | 7/2011 | Crombez | B60W 10/06 903/903 |
| 2011/0200193 A1* | 8/2011 | Blitz | H04W 12/126 707/769 |
| 2014/0052323 A1* | 2/2014 | Reichel | G06F 17/00 701/1 |
| 2014/0156134 A1* | 6/2014 | Cullinane | G05D 1/0212 701/23 |
| 2015/0046352 A1* | 2/2015 | Blitz | H04W 12/126 705/318 |
| 2015/0066257 A1* | 3/2015 | Ochocinski | B60K 28/10 180/65.21 |
| 2016/0229414 A1* | 8/2016 | Desnoyer | G01C 21/34 |
| 2017/0021765 A1* | 1/2017 | Mori | B60R 1/00 |
| 2017/0028987 A1* | 2/2017 | Yamada | B60N 2/01 |
| 2017/0305425 A1* | 10/2017 | Xing | B60W 50/0098 |
| 2017/0309086 A1* | 10/2017 | Zhai | A61B 5/0013 |
| 2018/0126985 A1* | 5/2018 | Lee | B60W 30/09 |
| 2018/0208028 A1* | 7/2018 | Seubert | G01S 17/931 |
| 2019/0004514 A1* | 1/2019 | Hiwatashi | B60W 60/0053 |
| 2019/0064799 A1* | 2/2019 | Amirloo Abolfathi | G05D 1/0055 |
| 2019/0106117 A1* | 4/2019 | Goldberg | G05D 1/0088 |
| 2019/0197497 A1* | 6/2019 | Abari | G05D 1/0088 |
| 2019/0317506 A1* | 10/2019 | Ishioka | B60W 50/14 |
| 2019/0375298 A1* | 12/2019 | Symanow | B60L 50/61 |
| 2020/0013242 A1* | 1/2020 | Hamada | G08G 1/16 |
| 2020/0031274 A1* | 1/2020 | Redick | B60Q 1/507 |
| 2020/0055524 A1* | 2/2020 | Lacaze | G05D 1/0088 |
| 2020/0189651 A1* | 6/2020 | Hansson | B62D 5/0487 |
| 2020/0200558 A1* | 6/2020 | Xu | G01C 21/3415 |
| 2020/0225683 A1* | 7/2020 | Alvarez | B60W 50/04 |
| 2020/0331493 A1* | 10/2020 | Wu | B60W 50/023 |
| 2020/0346553 A1* | 11/2020 | Grimm | B60L 53/65 |
| 2020/0409929 A1* | 12/2020 | Kodavarti | G06F 16/2365 |
| 2021/0024097 A1* | 1/2021 | Jardine | B60W 60/001 |
| 2021/0129696 A1* | 5/2021 | Westfall | H02J 7/0045 |
| 2021/0331681 A1* | 10/2021 | Im | B60W 50/08 |
| 2021/0370985 A1* | 12/2021 | Lee | B60W 60/0053 |
| 2022/0009492 A1* | 1/2022 | Adwan | B60W 40/105 |
| 2022/0080879 A1* | 3/2022 | Moon | B60Q 1/547 |
| 2022/0089170 A1* | 3/2022 | Hu | B60W 60/0053 |
| 2022/0122213 A1* | 4/2022 | Ortiz | G06Q 50/40 |
| 2022/0126879 A1* | 4/2022 | Igarashi | B60W 40/12 |
| 2022/0179432 A1* | 6/2022 | Nojoumian | H04L 67/12 |
| 2022/0185297 A1* | 6/2022 | Jung | G01S 13/867 |
| 2022/0266872 A1* | 8/2022 | Sakurada | G01C 21/3605 |
| 2022/0348225 A1* | 11/2022 | Kumano | B60W 60/0015 |
| 2022/0371468 A1* | 11/2022 | Eliseev | B60L 53/66 |
| 2023/0082897 A1* | 3/2023 | Salehi | B60W 10/04 701/2 |
| 2023/0150494 A1* | 5/2023 | Adam | B60W 10/20 701/41 |
| 2023/0166748 A1* | 6/2023 | Ukai | B60W 50/14 701/23 |
| 2023/0302906 A1* | 9/2023 | Ha | B60K 35/00 |
| 2023/0398891 A1* | 12/2023 | Madden | B60L 53/36 |
| 2024/0025383 A1* | 1/2024 | Treharne | B60W 30/18127 |

* cited by examiner

| AUTOMATIC DRIVING PERMISSION CONDITION | CONDITION CONTENT |
|---|---|
| CONDITION (1): ABSOLUTE CONDITION | ALL SENSORS AND CONTROL DEVICES INVOLVED IN AUTOMATIC DRIVING ARE NORMAL |
| CONDITION (2): ABSOLUTE CONDITION | THERE IS NO POWER SUPPLY FAILURE |
| CONDITION (3): TEMPORARY CONDITION | SOC OF LiB IS EQUAL TO OR HIGHER THAN AUTOMATIC DRIVING PERMITTING SOC |
| CONDITION (4): TEMPORARY CONDITION | VEHICLE IS TRAVELING ON A ROAD ON WHICH AUTOMATIC DRIVING IS POSSIBLE |

CONTROL DEVICE AND CONTROL METHOD

CROSS-REFERENCE TO RELATED APPLICATIONS

This application is based upon and claims the benefit of priority from prior Japanese patent application No. 2022-013612, filed on Jan. 31, 2022, the entire contents of which are incorporated herein by reference.

TECHNICAL FIELD

Embodiments disclosed herein relate to a control device and a control method.

BACKGROUND ART

Some automatic driving vehicles have a control device configured to notify a driver whether automatic driving is possible at the present time, when there is a condition for permitting automatic driving, such as a condition that a sensor for automatic driving is normal. For example, the control device notifies the driver whether the automatic driving is possible by changing a background color of a display between a state where the automatic driving can be permitted and a state where the automatic driving cannot be permitted (for example, see JP-A-2021-9432).

SUMMARY OF INVENTION

Technical Problem

However, the automatic driving is permitted when a plurality of conditions are satisfied. In a case where the automatic driving is not permitted, the user cannot recognize the reason why the automatic driving cannot be performed, and do not know what measure to take.

Aspects of the embodiment have been made in view of the above, and an object thereof is to provide a control device and a control method capable of notifying a user of a reason why automatic driving is not permitted.

Solution to Problem

According to aspects of the embodiment, there is provided a control device including a controller configured to perform a notification whether automatic driving of a vehicle is able to be started, in a different mode according to at least either of a first state where the automatic driving is able to be permitted, a second state where the automatic driving is unable to be permitted due to an equipment abnormality, or a third state where the automatic driving is unable to be permitted for a temporary reason without an equipment abnormality.

Effects of Invention

According to the control device and the control method according to the aspects of the embodiment, it is possible to notify the user of the reason why the automatic driving is not permitted.

DESCRIPTION OF EMBODIMENTS

Hereinafter, embodiments of a control device and a control method will be described in detail with reference to the accompanying drawings. Note that the present invention is not limited to the embodiments described below.

1. Configuration of Notification System

Figure 1:
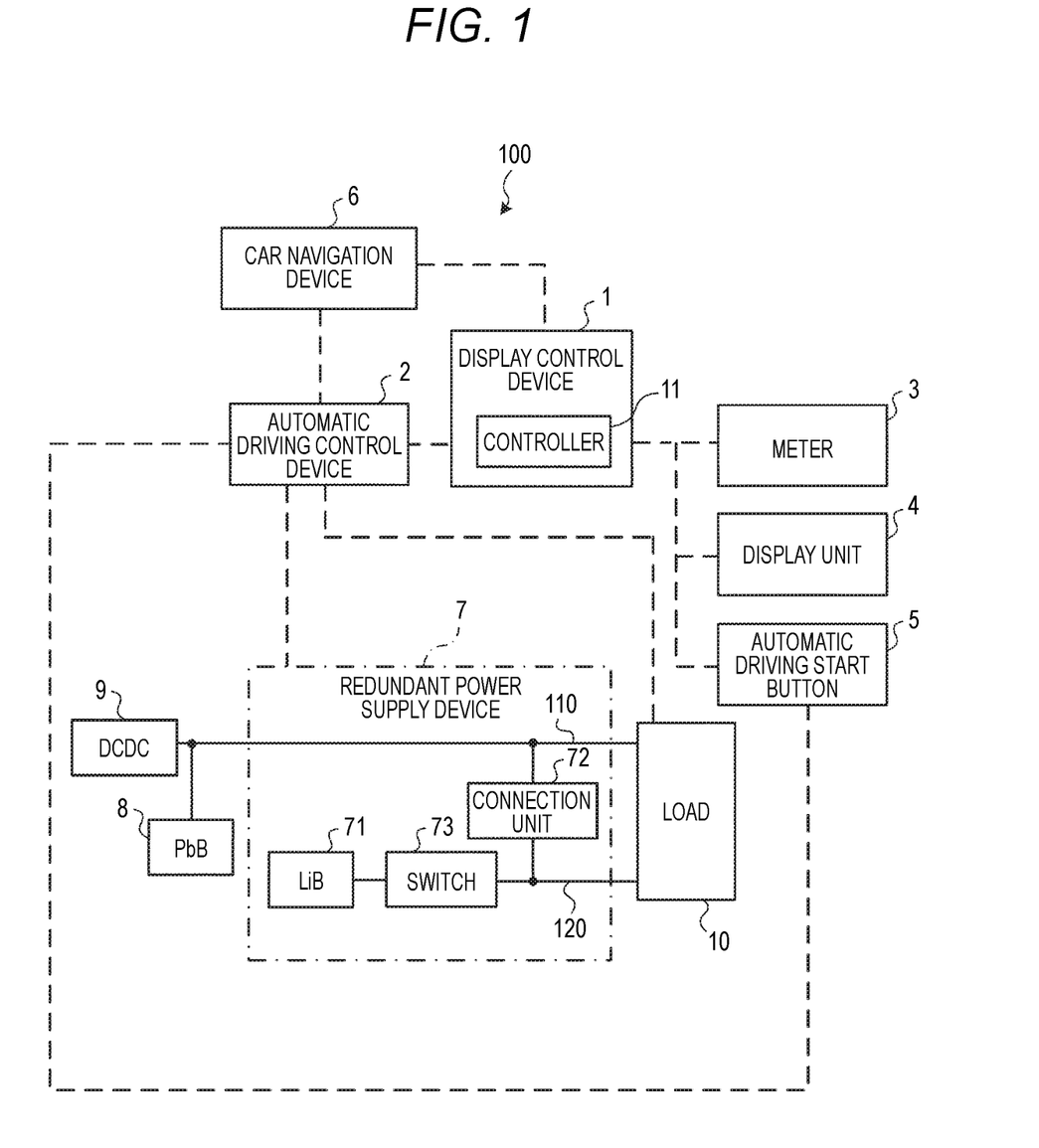
FIG. 1 is an explanatory diagram illustrating a configuration example of a notification system according to an embodiment.

FIG. 1 is an explanatory diagram illustrating a configuration example of a notification system 100 according to an embodiment. The notification system 100 is a system that is mounted on a vehicle having an automatic driving function and notifies a user whether the vehicle is in a state where automatic driving can be permitted or in a state where automatic driving cannot be permitted. In FIG. 1, a power supply line is indicated by a solid line, and a control signal line is indicated by a broken line.

As illustrated in FIG. 1, the notification system 100 includes a display control device 1, an automatic driving control device 2, a meter 3, a display unit 4, an automatic driving start button 5, a car navigation device 6, and a redundant power supply device 7.

The notification system 100 further includes a lead battery (hereinafter, referred to as "PbB 8"), a DC/DC converter (hereinafter, referred to as "DCDC 9"), and a load 10. The PbB 8 is a secondary battery that is mounted on the vehicle and supplies electric power to the load 10 and the like.

The DCDC 9 is a device that changes a voltage of electric power generated by an alternator that converts kinetic energy of the vehicle into electric energy. The DCDC 9 performs charging of the PbB 8, electric power supply to the redundant power supply device 7, and the like.

The load 10 includes, for example, a plurality of electronic controllers (ECUs) that function to automatically drive the vehicle, such as an engine control device, a steering control device, and a brake control device.

The display control device 1 is a device that controls at least one of the meter 3, the display unit 4, and the automatic driving start button 5 to notify the user of the vehicle whether the vehicle is in a state where automatic driving is permitted or in a state where automatic driving is not permitted.

The display control device 1 includes a controller 11. The controller 11 includes a microcomputer having a central processing unit (CPU), a read only memory (ROM), a random access memory (RAM), and the like, and various circuits. The controller 11 controls the meter 3, the display unit 4, and the automatic driving start button 5 by the CPU executing a program stored in the ROM using the RAM as a work area.

The entire controller 11 or a part thereof may be configured with hardware such as an application specific integrated circuit (ASIC) or a field programmable gate array (FPGA).

The meter 3 is a display device that is provided in an instrument panel of the vehicle and displays a traveling speed of the vehicle, a state of the vehicle, and the like. The display unit 4 is, for example, a display device that displays a route guidance image of the car navigation device 6, a state of the vehicle, and the like. The display unit 4 includes a speaker, and can output sound of route guidance, various notifications, and the like.

The automatic driving start button 5 is, for example, a switch that is provided at a steering wheel of the vehicle and is operated by the user for starting automatic driving of the vehicle. The automatic driving start button 5 is configured to emit light in a color corresponding to a state of the vehicle.

The automatic driving control device 2 is a device that operates the load 10 to perform automatic driving control of the vehicle in a case where it is determined that automatic driving can be permitted according to a state of the vehicle when the automatic driving start button 5 is turned on. An example of an automatic driving permission condition used by the automatic driving control device 2 to determine whether automatic driving can be permitted will be described later with reference to FIG. 2.

The automatic driving control device 2 outputs a determination result as to whether automatic driving can be permitted to the display control device 1. At this time, when it is determined that the automatic driving cannot be permitted, the automatic driving control device 2 outputs information indicating a reason why the automatic driving cannot be permitted to the display control device 1 together with the determination result.

The car navigation device 6 is a device that shows the user a route leading from a current location to a destination set by the user. The car navigation device 6 causes the display control device 1 to display a route guidance image on the display unit 4. The car navigation device 6 outputs information on the route leading from a current location to the destination of the vehicle to the automatic driving control device 2 during the route guidance.

The redundant power supply device 7 includes a lithium ion battery (hereinafter referred to as "LiB 71"). The LiB 71 is, for example, a backup secondary battery that supplies electric power to the load 10 or the like when electric power cannot be supplied by the PbB 8 or the DCDC 9.

The redundant power supply device 7 includes a first system 110 that supplies electric power input from the PbB 8 or the DCDC 9 to the load 10 or the like, a second system 120 that supplies electric power charged to the LiB 71 to the load 10 or the like, a connection unit 72 that connects and disconnects both systems, and a switch 73 that connects the LiB 71 to the second system 120. The connection unit 72 is configured with a switch or a DC-DC converter.

Although not illustrated, the first system 110 and the second system 120 are also connected to electronic equipment mounted on the vehicle, such as the display control device 1, the automatic driving control device 2, the meter 3, the display unit 4, and the automatic driving start button 5, and supply electric power to the electronic devices.

In the redundant power supply device 7, a controller including a microcomputer (not shown) performs various types of control. The redundant power supply device 7 monitors states of the first system 110 and the second system 120, for example, by detecting voltages of the first system 110 and the second system 120. In a normal state where no power supply failure occurs, the redundant power supply device 7 electrically connects the connection unit 72 and disconnects the switch 73, and supplies electric power input from the PbB 8 or the DCDC 9 to the load 10 or the like via the first system 110 and the second system 120.

When a power supply failure occurs, the redundant power supply device 7 outputs information indicating the occurrence of the power supply failure to the automatic driving control device 2. For example, when a voltage of the first system 110 becomes equal to or less than a ground fault threshold, the redundant power supply device 7 determines that a ground fault occurred in the first system 110, notifies the automatic driving control device 2 of it, and disconnects the connection unit 72 and electrically connects the switch 73 to supply electric power charged in the LiB 71 to the load 10 or the like via the second system 120.

Accordingly, for example, when a ground fault occurs in the first system 110, the automatic driving control device 2 operates the load 10 by the electric power supplied from the LiB 71 via the second system 120, and thus can cause the vehicle to perform evacuation traveling to a safe place and stop.

When the redundant power supply device 7 detects a disconnection of the first system 110 or the second system 120 or a failure of the PbB 8, the DCDC 9, or the LiB 71 in addition to the ground fault of the first system 110, the redundant power supply device 7 outputs information indicating the detection to the automatic driving control device 2.

In addition, the redundant power supply device 7 monitors a state of charge (SOC) of the LiB 71. When the SOC of the LiB 71 becomes less than a predetermined SOC (for example, 80%), the redundant power supply device 7 electrically connects the connection unit 72 and electrically connects the switch 73 to charge the LiB 71 to a target SOC (for example, 90%) by using electric power input from the PbB 8 or the DCDC 9.

A DC/DC converter may be provided in parallel with the switch 73, and the DC/DC converter may be activated to charge the LiB 71. That is, the redundant power supply device 7 may electrically connect the connection unit 72, disconnect the switch 73, and activate the DC/DC converter to step up or step down a voltage input from the PbB 8 or the DCDC 9 to charge the LiB 71.

When the LiB 71 is not being charged, the redundant power supply device 7 outputs information indicating it to the automatic driving control device 2. When the LiB 71 is being charged, the redundant power supply device 7 outputs information, which indicates the LiB 71 is being charged, and a predicted time until completion of the charging to the automatic driving control device 2.

The automatic driving control device 2 determines whether automatic driving can be permitted, based on information input from the redundant power supply device 7, information input from the car navigation device 6, and information indicating states of various sensors acquired from the various sensors used for automatic driving.

Figure 2:
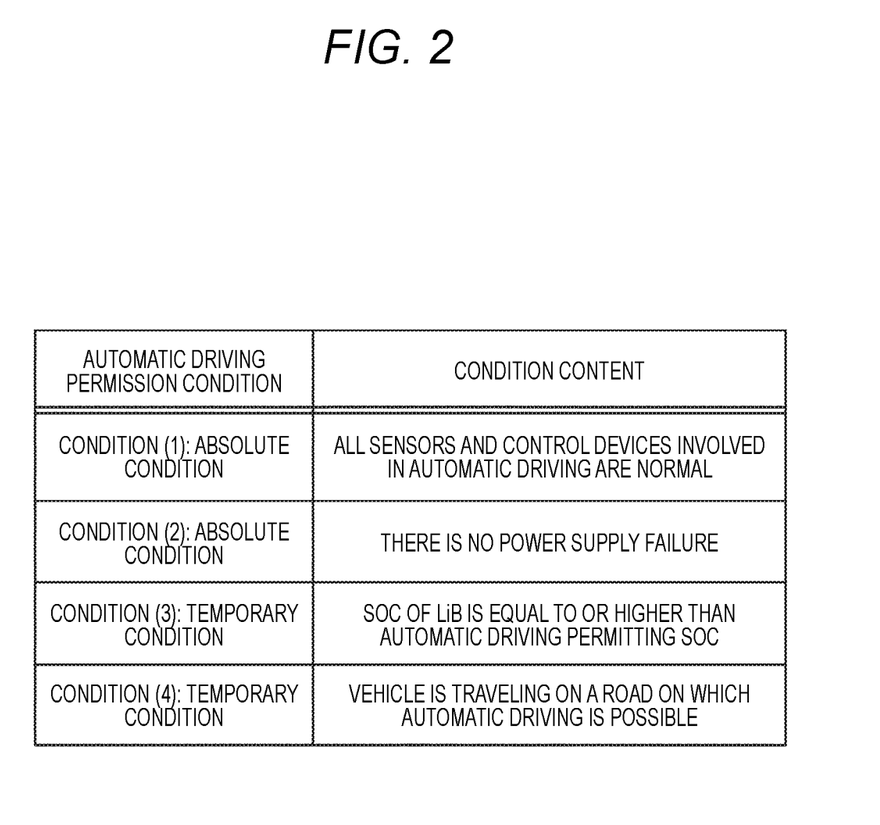
FIG. 2 is an explanatory table illustrating an example of an automatic driving permission condition according to the embodiment.

Here, a method of determining, by the automatic driving control device 2, whether the automatic driving can be permitted will be described with reference to FIG. 2. FIG. 2 is an explanatory table illustrating an example of an automatic driving permission condition according to the embodiment. The automatic driving control device 2 stores, for example, the automatic driving permission condition illustrated in FIG. 2, and based on whether a state of the vehicle satisfies the automatic driving permission condition, determines whether automatic driving can be permitted.

As illustrated in FIG. 2, the automatic driving permission condition includes, for example, conditions (1) to (4), and the automatic driving is permitted when all the conditions are satisfied. Regarding absolute conditions of the conditions (1) and (2), when the absolute conditions (1) and (2) are unsatisfied, repair of the vehicle is required. Regarding temporary conditions of the conditions (3) and (4), even when unsatisfied, the temporary conditions (3) and (4) will be satisfied as time elapses.

Specifically, the condition (1) is that "all sensors involved in the automatic driving and all the control devices involved in the automatic driving are normal". The condition (2) is that "there is no power supply failure". The condition (3) is that "SOC of the LiB 71 is equal to or higher than an automatic driving permitting SOC (for example, 80%)". The condition (4) is that "vehicle is traveling on a road allowing automatic driving (for example, a certain section of an expressway)".

The automatic driving control device 2 determines the satisfaction state of the conditions (1) to (4) based on the information acquired from the redundant power supply device 7, the car navigation device 6, and the various sensors, and outputs information indicating the determined satisfaction state to the display control device 1. The display control device 1 performs display and sound notification according to the satisfaction state of the conditions, based on the information input from the automatic driving control device 2.

At this time, the controller 11 of the display control device 1 notifies the user whether the automatic driving can be started, using different modes according to a first state where the automatic driving of the vehicle can be permitted, a second state where an abnormality occurs in equipment and the automatic driving cannot be permitted, and a third state where no abnormality occurs in equipment but the automatic driving cannot be permitted for a temporary reason.

For example, the display control device 1 notifies the user whether the automatic driving can be started by using a display region of the meter 3, a display region of the display unit 4, a speaker of the display unit 4, and the automatic driving start button 5. Accordingly, the display control device 1 can notify, by using a difference in the notification mode, the user of the reason why the automatic driving is not permitted.

When the first state is established where all of the conditions (1) to (4) are satisfied and the automatic driving can be permitted, the display control device 1 performs a notification of a first mode. When the second state is established where an abnormality occurs in equipment, the condition (1) or the condition (2) is unsatisfied and the automatic driving cannot be permitted, the display control device 1 performs a notification of a second mode.

When the third state is established where no abnormality occurs in equipment, the condition (3) or the condition (4) is unsatisfied for a temporary reason, and the automatic driving cannot be permitted, the display control device 1 performs a notification of a third mode. Next, notification examples of the first to third modes described above will be described with reference to FIGS. 3 to 10.

2. Notification Example

Figure 3:
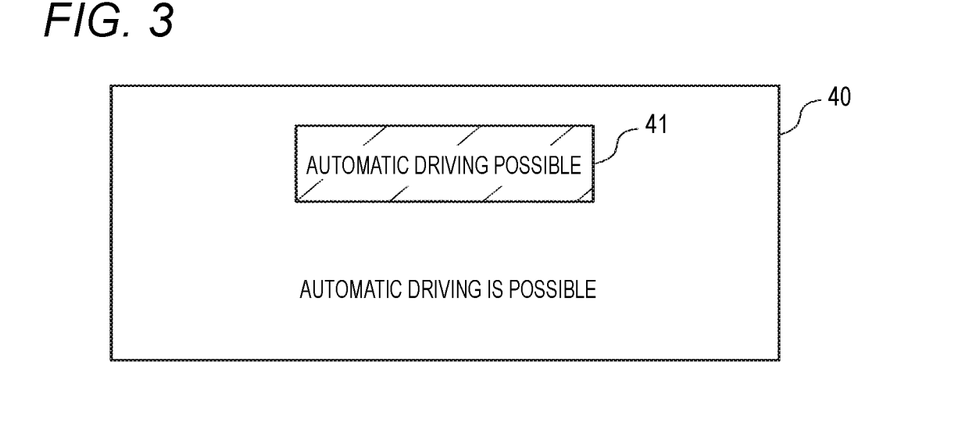
FIG. 3 is an explanatory diagram illustrating a notification example according to the embodiment.
Figure 4:
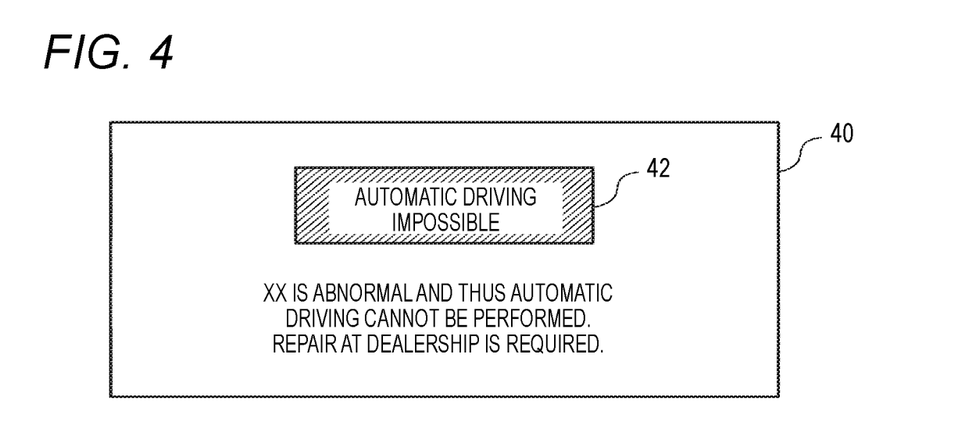
FIG. 4 is an explanatory diagram illustrating another notification example according to the embodiment.
Figure 5:
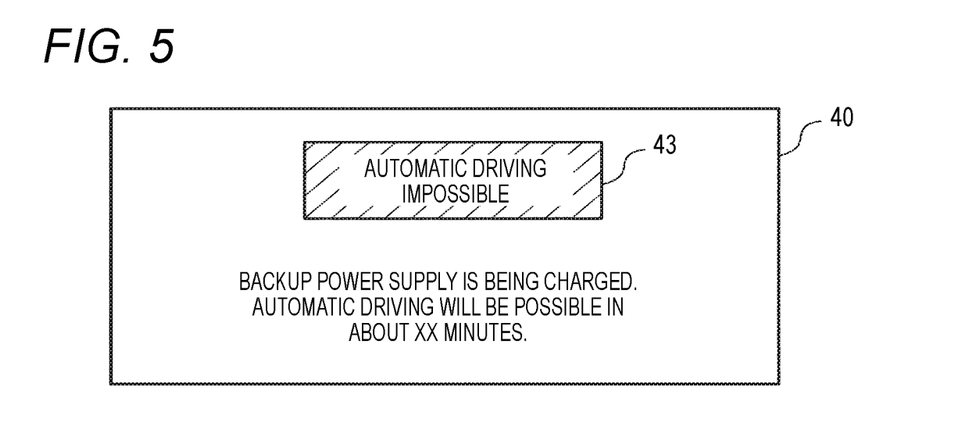
FIG. 5 is an explanatory diagram illustrating another notification example according to the embodiment.
Figure 6:
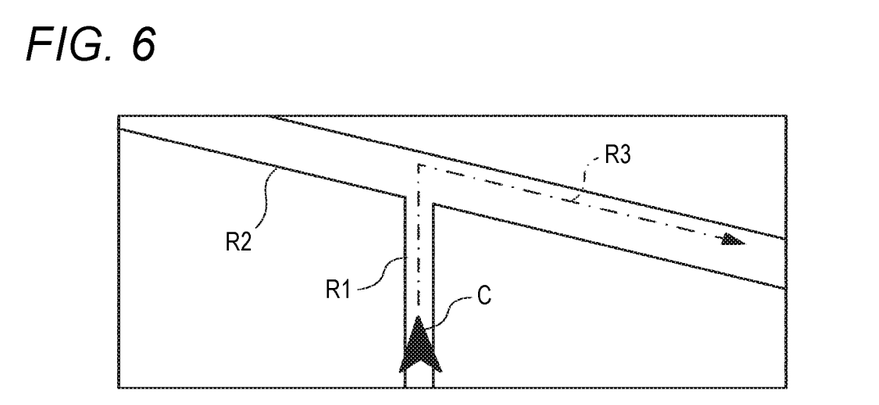
FIG. 6 illustrates an example of a route guidance screen according to the embodiment.
Figure 7:
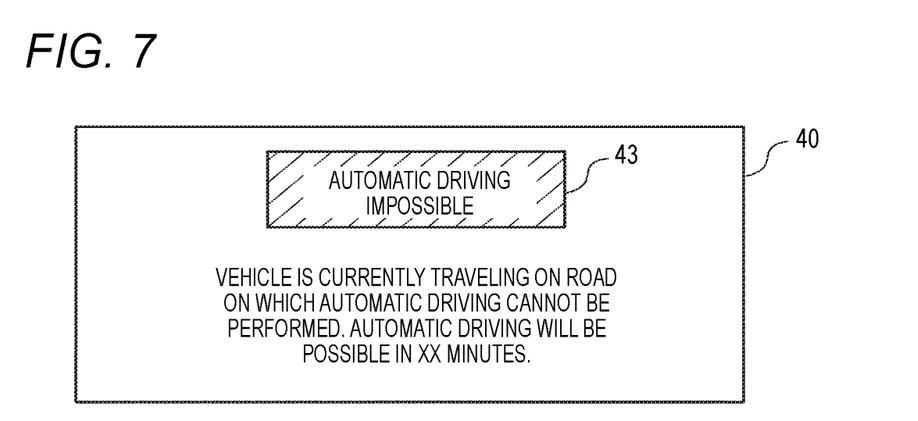
FIG. 7 is an explanatory diagram illustrating a notification example according to the embodiment.
Figure 8:
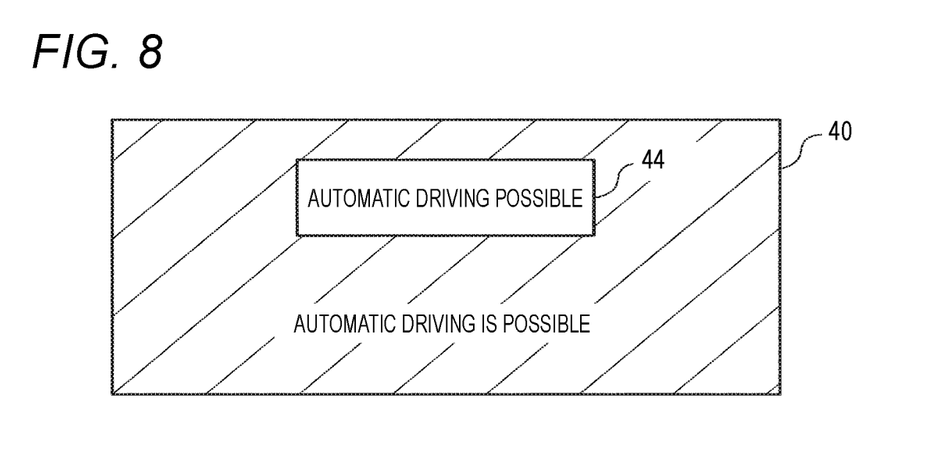
FIG. 8 is an explanatory diagram illustrating a notification example according to the embodiment.
Figure 9:
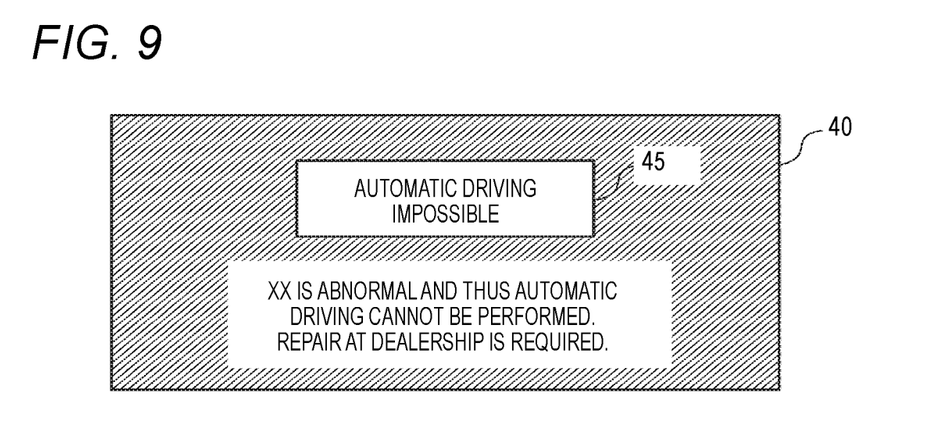
FIG. 9 is an explanatory diagram illustrating another notification example according to the embodiment.
Figure 10:
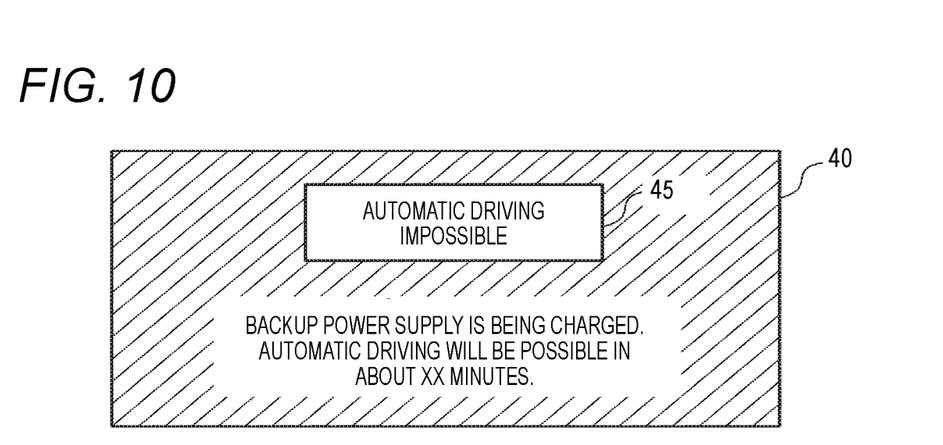
FIG. 10 is an explanatory diagram illustrating another notification example according to the embodiment.

FIGS. 3 to 5 and 7 to 10 are explanatory diagrams illustrating the notification examples according to the embodiment. FIG. 6 illustrates an example of a route guidance screen in a case where the condition (4) according to the embodiment is unsatisfied. Hatched regions in FIGS. 3 and 8 are green regions. Hatched regions in FIGS. 4 and 9 are red regions. Hatched regions in FIGS. 5, 7, and 10 are yellow regions.

For example, during manual driving, the display control device 1 can always notify the user of whether the automatic driving can be permitted. At this time, during manual driving of the vehicle, the controller 11 of the display control device 1 performs different displays in a predetermined region of the display unit 4 according to the first state, the second state, and the third state.

When the first state is established where the automatic driving can be permitted, the controller 11 of the display control device 1 displays, for example, the notification of the first mode illustrated in FIG. 3. Specifically, the controller 11 displays, for example, a green lamp 41 indicating "Automatic driving possible" in a predetermined region 40 of the display unit 4. Further, the controller 11 displays a message reading "Automatic driving is possible" below the green lamp 41. Accordingly, the display control device 1 can cause the user to recognize that the automatic driving is possible.

In addition, when the second state is established where an abnormality occurs in equipment and the automatic driving cannot be permitted, the controller 11 displays, for example, the notification of the second mode illustrated in FIG. 4. Specifically, the controller 11 displays, for example, a red lamp 42 indicating "Automatic driving impossible" in the predetermined region 40 of the display unit 4. Further, the controller 11 displays a message reading "XX is abnormal and thus automatic driving cannot be performed. Repair at dealership is required" below the red lamp 42. Accordingly, the display control device 1 can cause the user to recognize that the reason why the automatic driving cannot be permitted is an abnormality of equipment.

In addition, when the third state is established where no abnormality occurs in equipment and the automatic driving cannot be permitted because, for example, the LiB 71 is being charged due to a decreased SOC, the controller 11 displays, for example, the notification of the third mode illustrated in FIG. 5. Specifically, the controller 11 displays, for example, a yellow lamp 43 indicating "Automatic driving impossible" in the predetermined region 40 of the display unit 4. Further, the controller 11 displays a message reading "The backup power supply is being charged. Automatic driving will be possible in about XX minutes" below the yellow lamp 43.

As described above, the controller 11 notifies, as the third state, that the LiB 71 serving as the backup power supply is being charged. Accordingly, the display control device 1 enables the user to recognize that the reason why the automatic driving cannot be permitted is not the abnormality of the equipment but a temporary reason that the backup power supply is being charged.

In addition, when the charging of the LiB 71 is completed, the controller 11 switches the display to the display of the first mode illustrated in FIG. 3, and uses sound to notify the user that the automatic driving becomes possible. As described above, when the controller 11 notifies the user of the third state, the controller 11 notifies the user of the shift to the first state by sound. Accordingly, the display control device 1 enables the user, who cannot check the display unit 4 during driving, to recognize that the automatic driving becomes possible.

As illustrated in FIG. 6, the car navigation device 6 may guide the vehicle to a route R3 that leads from a road R1 on which automatic driving is not permitted to a road R2 on which automatic driving is permitted. When the third state where the automatic driving is not permitted is established since a vehicle C is traveling on the road R1, in the route R3, on which the automatic driving is not permitted, the controller 11 displays, for example, the notification of the third mode illustrated in FIG. 7.

Specifically, the controller 11 displays, for example, the yellow lamp 43 indicating "Automatic driving impossible" in the predetermined region 40 of the display unit 4. Further, the controller 11 displays, below the yellow lamp 43, a message reading "The vehicle is currently traveling on a road on which automatic driving cannot be performed. Automatic driving will be possible in XX minutes". Accordingly, the display control device 1 enables the user to recognize that the reason why the automatic driving cannot be permitted is not the abnormality of the equipment but a temporary reason that the vehicle is traveling on the road R1 on which the automatic driving is not permitted.

As described, since the controller 11 performs the notifications of the different modes correspondingly to the first state, the second state, and the third state during the manual driving, the user may recognize, based on the difference in the modes of the notifications, a fact that the automatic driving is permitted or the reason why the automatic driving is not permitted.

In addition, since the controller 11 displays the lamps 41 to 43 having different colors correspondingly to the first state, the second state, and the third state, the user may intuitively recognize, based on the difference in color, the fact that the automatic driving is permitted or the reason why the automatic driving is not permitted.

The controller 11 may display the green lamp 41 illustrated in FIG. 3 when the automatic driving can be permitted, and may not display the red lamp 42 illustrated in FIG. 4 and the yellow lamp 43 illustrated in FIG. 5 when the automatic driving cannot be permitted. Accordingly, the user may easily recognize whether the automatic driving is possible, based on whether the green lamp 41 illustrated in FIG. 3 is displayed.

The controller 11 can also output the messages shown in FIGS. 3 to 5 by sound to notify the user of the messages. The user, who cannot check the display unit 4 during driving, may reliably recognize whether the automatic driving is possible and, in a case where the automatic driving is not possible, the reason why the automatic driving is not possible.

In addition, the controller 11 may change only the color of the words instead of using the green lamp 41 illustrated in FIG. 3, the red lamp 42 illustrated in FIG. 4, and the yellow lamp 43 illustrated in FIG. 5. For example, the controller 11 displays words of "Automatic driving possible" in green as the notification of the first mode, displays words of "Automatic driving impossible" in red as the notification of the second mode, and displays words of "Automatic driving impossible" in yellow as the notification of the third mode. Accordingly, even if the user who is driving does not understand the content of the words, the user may intuitively recognize, by only the color of the words, whether the automatic driving is possible, and in a case where the automatic driving is not possible, the reason why the automatic driving is not possible.

In addition, the controller 11 can perform notifications of modes illustrated in FIGS. 8 to 10. When the first state is established where automatic driving can be permitted, the controller 11 displays, for example, a notification of a first mode illustrated in FIG. 8. Specifically, for example, the controller 11 sets a background color of the predetermined region 40 of the display unit 4 to green to display a lamp 44 indicating "Automatic driving possible", and displays "Automatic driving is possible" below the green lamp 44. Accordingly, the display control device 1 enables the user to recognize that the automatic driving is possible.

In addition, when the second state is established where an abnormality occurs in equipment and the automatic driving cannot be permitted, the controller 11 displays, for example, a notification of a second mode illustrated in FIG. 9. Specifically, for example, the controller 11 sets the background color of the predetermined region 40 of the display unit 4 to red and displays a lamp 45 indicating "Automatic driving impossible". Further, the controller 11 displays a message reading "XX is abnormal and thus automatic driving cannot be performed. Repair at dealership is required" below the lamp 45. Accordingly, the display control device 1 enables the user to recognize that the reason why the automatic driving cannot be permitted 30) is an abnormality of equipment.

In addition, when the third state is established where no abnormality occurs in equipment and the automatic driving cannot be permitted because, for example, the LiB 71 is being charged due to its decreased SOC, the controller 11 displays, for example, a notification of a third mode illustrated in FIG. 10. Specifically, for example, the controller 11 sets the background color of the predetermined region 40 of the display unit 4 to yellow and displays the lamp 45 indicating "Automatic driving impossible". Further, the controller 11 displays a message reading "The backup power supply is being charged. Automatic driving will be possible in about XX minutes" below the lamp 45. Accordingly, the display control device 1 enables the user to recognize that the reason why the automatic driving cannot be permitted is not an abnormality of equipment but a temporary reason that the backup power supply is being charged.

Although a case where the controller 11 causes the display unit 4 to display the notifications of the first to third modes has been described here, the controller 11 may display the notifications of the first, second or third mode in a predetermined region of the meter 3. In this case, the display control device 1 can improve the visibility of the notifications of the first, second or third mode for the user who is driving the vehicle.

In addition, the controller 11 may perform the notifications of the first, second or third mode based on a difference in color of the automatic driving start button 5 provided at the steering wheel. For example, when the first state is established where the automatic driving can be permitted, the controller 11 causes the automatic driving start button 5 to emit green light as the notification of the first mode.

When the second state is established where an abnormality occurs in equipment and the automatic driving cannot be permitted, the controller 11 causes the automatic driving start button 5 to emit red light as the notification of the second mode. When the third state is established where no abnormality occurs in equipment and the automatic driving cannot be permitted for a temporary reason, the controller 11 causes the automatic driving start button 5 to emit yellow light. In this case, the display control device 1 may change the color of the automatic driving start button 5 in accordance with the change of the notification made by the display unit 4 and the meter 3. Accordingly, the display control device 1 can improve the visibility of the notification.

In addition, the controller 11 may cause the meter 3 to display a lamp indicating whether the automatic driving is possible, and may perform the notifications of the first, second, or third mode according to a difference in lighting state of the lamp. For example, the controller 11 turns on the lamp when the first state is established where the automatic driving can be permitted.

When the second state is established where an abnormality occurs in equipment and the automatic driving cannot be permitted, the controller 11 causes the lamp to blink at a high speed. When the third state is established where no abnormality occurs in equipment and the automatic driving cannot be permitted for a temporary reason, the controller 11 causes the lamp to blink at a low speed. Accordingly, the display control device 1 enables the user to intuitively recognize, by the difference in the lighting state of the lamp, whether the automatic driving is possible, and in a case where the automatic driving is not possible, the reason why the automatic driving is not possible.

In addition, when in both the second state where an abnormality occurs in equipment and the automatic driving cannot be permitted, and the third state where no abnormality occurs in equipment and the automatic driving cannot be permitted for a temporary reason, the controller 11 notifies the user of the second state preferentially. Accordingly, the display control device 1 can quickly notify the user of the abnormality of the equipment to prompt the user to repair the device.

The controller 11 displays whether the vehicle is in the first state during manual driving of the vehicle. When the automatic driving start button 5 is turned on while the first state is not displayed, the controller 11 performs different notifications according to the second state and the third state. At this time, the controller 11 performs the notification of the second mode when the second state is established, and the controller 11 performs the notification of the third mode when the third state is established. Accordingly, the display control device 1 can prevent the user who does not turn on the automatic driving start button 5, that is, the user who does not desire the automatic driving, from being unnecessarily notified of the reason why the automatic driving cannot be permitted.

The controller 11 may be configured to perform different displays in the predetermined region 40 of the display unit 4 according to the first state, the second state, and the third state when the automatic driving start button 5 is operated. In this case, the controller 11 performs the notification of the first mode for a certain period of time (for example, 5 seconds) when the first state is established, performs the notification of the second mode for a certain period of time when the second state is established, and performs the notification of the third mode for a certain period of time when the third state is established. Accordingly, the display control device 1 can prevent the user who does not turn on the automatic driving start button 5, that is, the user who does not desire the automatic driving, from being unnecessarily notified of whether the automatic driving is possible and a reason why the automatic driving cannot be permitted.

When the first state is not established, the controller 11 performs different notifications according to time until establishment of a state where the automatic driving can be started. For example, when the third state is established where the automatic driving cannot be performed temporarily, the controller 11 causes the meter 3 to turn on a number of indicator lamps corresponding to the time until establishment of the state where the automatic driving can be started. Then, the controller 11 reduces the number of the turned-on indicator lamps as the time until the establishment of the state where the automatic driving can be started decreases.

The controller 11 may increase the number of turned-on indicator lamps as the time until the establishment of the state where the automatic driving can be started decreases. Accordingly, for example, the display control device 1 can cause the user to intuitively recognize the time until the establishment of the state where the automatic driving can be started. When the second state is established where repair is required, the controller 11 performs a display different from that in the third state, such as blinking all indicator lamps in red.

When the user turns on the automatic driving start button 5 twice (the first time and the second time) in the same trip and the vehicle is in the third state each time, the controller 11 may turn on a history flag. When the automatic driving permission condition changes from being unsatisfied to being satisfied and the history flag is on, the controller 11 may notify the user that the automatic driving is possible.

In a case where a notification regarding the third state is made when the automatic driving start button 5 is turned on by the user for the first time, and then the automatic driving start button 5 is turned on for the second time by the user, who may think the automatic driving permission condition is about to be satisfied, but the vehicle is still in the third state, the display control device 1 can determine that the user has an intention to start the automatic driving quickly. Accordingly, the display control device 1 can immediately performs a notification when the automatic driving permission condition is satisfied.

3. Processing Executed by Display Control Device

Figure 11:
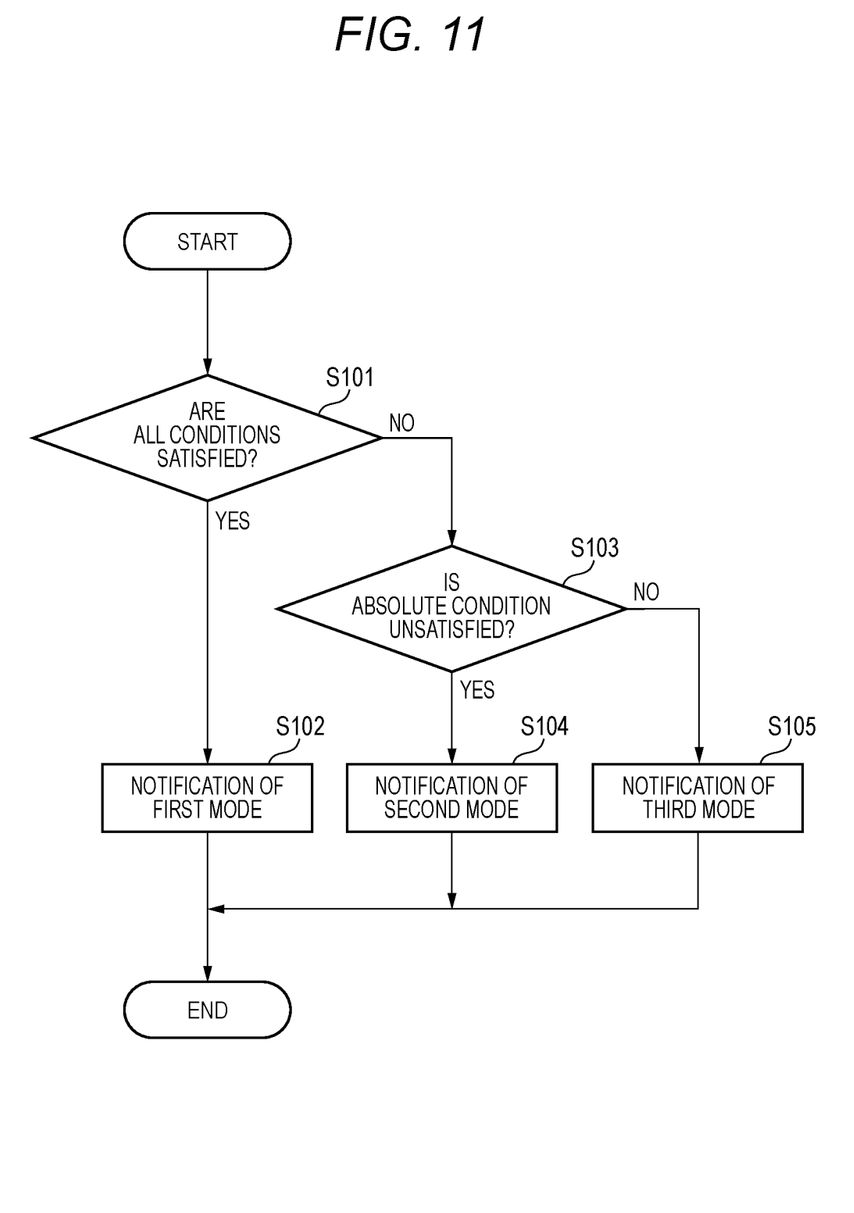
FIG. 11 is a flowchart illustrating an example of processing executed by a controller 11 according to the embodiment.
Figure 12:
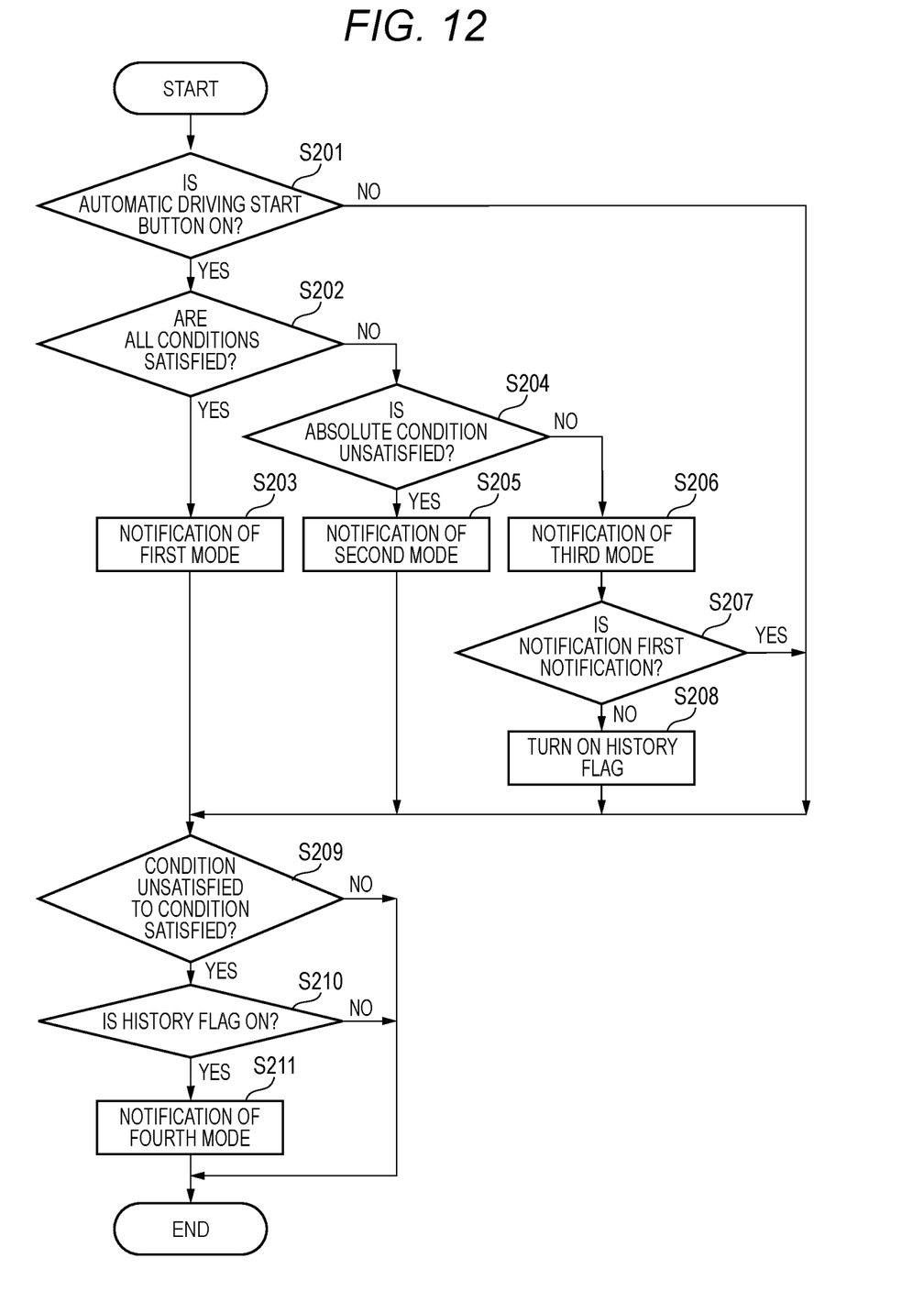
FIG. 12 is a flowchart illustrating an example of processing executed by the controller 11 according to the embodiment.

Next, processing executed by the controller 11 according to the embodiment will be described with reference to FIGS. 11 and 12. FIGS. 11 and 12 are flowcharts illustrating examples of the processing performed by the controller 11 according to the embodiment. The controller 11 repeatedly executes the processing illustrated in FIG. 11 during a period from when an ignition switch (hereinafter, referred to as "IG") of a vehicle on which the display control device 1 is mounted is turned on to when the IG is turned off.

Specifically, as illustrated in FIG. 11, when the IG is turned on, the controller 11 first determines whether all the conditions are satisfied (step S101). When it is determined that all the conditions are satisfied (Yes in step S101), the controller 11 performs the notification of the first mode (step S102). Thereafter, the controller 11 ends the processing and starts the processing again from step S101.

When it is determined that not all the conditions are satisfied (No in step S101), the controller 11 determines whether an absolute condition is unsatisfied (step S103). When the controller 11 determines that the absolute condition is unsatisfied (Yes in step S103). The notification of the second mode is performed (step S104). Thereafter, the controller 11 ends the processing and starts the processing again from step S101.

When it is determined that the absolute condition is not unsatisfied, that is, the absolute condition is satisfied (No at Step S103), the controller 11 performs the notification of the third mode (step S105). Thereafter, the controller 11 ends the processing and starts the processing again from step S101.

Although a case where the display control device 1 always notifies whether the automatic driving is possible during the IG-on period has been described here, the controller 11 may also notify whether the automatic driving is possible when the automatic driving start button 5 is turned on.

Next, with reference to FIG. 12, processing executed by the controller 11 in a case of notifying whether automatic driving is possible when the automatic driving start button 5 is turned on will be described. In this case, as illustrated in FIG. 12, when the IG is turned on, the controller 11 first determines whether the automatic driving start button 5 is turned on (step S201).

When it is determined that the automatic driving start button 5 is not turned on (No in step S201), the controller 11 proceeds to step S209. When it is determined that the automatic driving start button 5 is turned on (Yes in step S201), the controller 11 determines whether all the conditions are satisfied (step S202).

When it is determined that all the conditions are satisfied (Yes in step S202), the controller 11 performs the notification of the first mode for a certain period of time (step S203), and advances the processing to step S209. When it is determined that not all the conditions are satisfied (No in step S202), the controller 11 determines whether an absolute condition is unsatisfied (step S204).

When it is determined that the absolute condition is unsatisfied (Yes in step S204), the controller 11 performs notification of the second mode for a certain period of time (step S205), and advances the processing to step S209. When it is determined that the absolute condition is not unsatisfied, that is, the absolute condition is satisfied (No in step S204), the controller 11 performs the notification of the third mode for a certain period of time (step S206).

Subsequently; the controller 11 determines whether the notification of the third mode is a first notification of the third mode that is performed for the first time (step S207). When it is determined that the notification is the first notification (Yes in step S207), the controller 11 advances the processing to step S209. When it is determined that the notification is not a first notification (No in step S207), the controller 11 turns on a history flag (step S208), and advances the processing to step S209.

In step S209, the controller 11 determines whether a transition from a state where the conditions are unsatisfied to a state where the conditions are satisfied is achieved, and when it is determined that the transition is not achieved (No in step S209), the controller 11 ends the processing and starts the processing again from step S201.

When it is determined that the transition from the state where the conditions are unsatisfied to the state where the conditions are satisfied is achieved (Yes in step S209), the controller 11 determines whether the history flag is on (step S210). When it is determined that the history flag is not on (No in step S210), the controller 11 ends the processing and starts the processing again from step S201.

When it is determined that the history flag is on (Yes in step S210), the controller 11 performs a notification of a fourth mode (step S211). For example, as the notification of the fourth mode, the controller 11 blinks the green lamp 41 shown in FIG. 3, and displays a message reading "Automatic driving is enabled" below the green lamp 41. Thereafter, the controller 11 ends the processing and starts the processing again from step S201.

The processing of steps S207, S208, and S210 described above may be omitted. In this case, when the automatic driving start button 5 is turned on, if the notification of the third mode is performed for the reason of the third state (for example, the LiB 71 is being charged or the vehicle is not traveling on the road R2 on which the automatic driving is permitted), it is notified that the automatic driving becomes possible at a time-point when the conditions are satisfied.

The display control device 1 controls the meter 3, the display unit 4, and the automatic driving start button 5 to perform the notifications of the first to third modes in the embodiment described above, and alternatively, the automatic driving control device 2 may control the meter 3, the display unit 4, and the automatic driving start button 5 to perform the notifications of the first to third modes. In addition, when the notifications are performed only by the display unit 4, the car navigation device 6 may execute the same processing as the display control device 1 to perform the notifications of the first to third modes.

Additional effects and modifications can be easily derived by a person skilled in the art. Therefore, broader aspects of the present invention are not limited to the specific details and the representative embodiment shown and described above. Therefore, various modifications can be made without departing from the spirit or scope of the general inventive concept as defined by the appended claims and equivalents of the claims.

What is claimed is:

1. A control device for a vehicle capable to operate an automatic driving, the vehicle having a redundant power supply including a connector that connects and disconnects a first system to supply electric power from a first power supply to a load and a second system to supply electric power from a second power supply to the load, and a switch that connects and disconnects the second power supply and the second system, the redundant power supply being configured to, in a normal state, connect the connector and disconnect the switch to supply electric power from the first power supply to the load using the first system and the second system, the redundant power supply being configured to, in a charging state to perform a charge processing, connect the switch to supply electric power from the first power supply to the second power supply to charge the second power supply, the redundant power supply being configured to, in response to a failure occurring in the first power supply, disconnect the connector to disconnect the first system and connect the switch to cause the vehicle to perform evacuation traveling using the second system to which electric power is supplied from the second power supply, the control device comprising:
a controller configured to perform a first notification to indicate that the automatic driving of the vehicle is able to be started, a second notification to indicate that the automatic driving is unable to be permitted due to an equipment abnormality, and a third notification to indicate that the automatic driving is temporarily unable to be permitted as the second power supply is being charged by the charge processing in a different mode according to at least either of a first state where the automatic driving is able to be permitted, a second state where the automatic driving is unable to be permitted due to an equipment abnormality, or a third state where the automatic driving is unable to be permitted for a temporary reason without an equipment abnormality manner, wherein
the controller is configured to switch from the third notification to the first notification upon completion of charging of the second power supply.

2. The control device according to claim 1, wherein,
when the controller performs the second notification preferentially when the equipment abnormality occurs and when the redundant power supply is being charged.

3. The control device according to claim 1, wherein,
during manual driving of the vehicle, the controller performs a display differently as either of the first notification, the second notification, or the third notification, in a predetermined region of a display.

4. The control device according to claim 2, wherein,
during manual driving of the vehicle, the controller performs a display differently as either of the first notification, the second notification, or the third notification, in a predetermined region of a display.

5. The control device according to claim 1, wherein,
in response to an automatic driving start button being operated, the controller performs a display differently as either of the first notification, the second notification, or the third notification, in a predetermined region of a display.

6. The control device according to claim 2, wherein,
in response to an automatic driving start button being operated, the controller performs a display differently as either of the first notification, the second notification, or the third notification, in a predetermined region of a display.

7. The control device according to claim 3, wherein,
in response to an automatic driving start button being operated, the controller performs the display differently as either of the first notification, the second notification, or the third notification, in the predetermined region of the display.

8. The control device according to claim 4, wherein,
in response to an automatic driving start button being operated, the controller performs the display differently as either of the first notification, the second notification, or the third notification, in the predetermined region of the display.

9. The control device according to claim 1, wherein,
when the controller switches from the third notification to the first notification, the controller performs another notification by a sound.

10. The control device according to claim 1, wherein
the controller performs a display whether the automatic driving of the vehicle is able to be started during manual driving of the vehicle, and,
in response to an automatic driving start button being turned on while not performing the display that the automatic driving of the vehicle is able to be started, the controller performs a different notification between a case where the automatic driving is unable to be permitted due to the equipment abnormality and a case where the automatic driving is unable to be permitted as the second power supply device is being charged.

11. The control device according to claim 1, wherein
while the automatic driving of the vehicle is not able to be started, the controller performs a different notification according to time until the automatic driving of the vehicle is able to be started.

12. The control device according to claim 1, wherein the first notification, the second notification, and the third notification is performed using different colors.

13. The control device according to claim 1, wherein the third notification is performed by indicating a reason why the automatic driving is temporarily unable to be permitted.

14. The control device according to claim 1, wherein the third notification is performed with an indication of an estimated time until the automatic driving becomes available.

15. A control method for a vehicle capable to operate an automatic driving, the vehicle having a redundant power supply including a connector that connects and disconnects a first system to supply electric power from a first power supply to a load and a second system to supply electric power from a second power supply to the load, and a switch that connects and disconnects the second power supply and the second system, the redundant power supply being configured to, in a normal state, connect the connector and disconnect the switch to supply electric power from the first power supply to the load using the first system and the second system, the redundant power supply being configured to, in a charging state to perform a charge processing, connect the switch to supply electric power from the first power supply to the second power supply to charge the second power supply, the redundant power supply being configured to, in response to a failure occurring in the first power supply, disconnect the connector to disconnect the first system and connect the switch to cause the vehicle to perform evacuation traveling using the second system to which electric power is supplied from the second power supply, the method comprising:
performing a first notification to indicate that automatic driving of the vehicle is able to be started, a second notification to indicate that the automatic driving is unable to be permitted due to an equipment abnormality, and a third notification to indicate that the automatic driving is temporarily unable to be permitted as the second power supply device is being charged by the charge processing in a different mode according to at least either of a first state where the automatic driving is able to be permitted, a second state where the automatic driving is unable to be permitted due to an equipment abnormality, or a third state where the automatic driving is unable to be permitted for a temporary reason without an equipment abnormality manner; and
switching from the third notification to the first notification upon completion of charging of the second power supply.

* * * * *